United States Patent [19]

Yuasa et al.

[11] Patent Number: 4,808,227

[45] Date of Patent: Feb. 28, 1989

[54] SEMI-SOLID INK

[75] Inventors: Toshiya Yuasa, Mitaka; Hiroshi Fukumoto, Kawasaki; Akihiro Mouri, Kokubunji; Shuzo Kaneko, Tokyo, all of Japan

[73] Assignee: Canon Kabushiki Kaisha, Tokyo, Japan

[21] Appl. No.: 79,154

[22] Filed: Jul. 29, 1987

[30] Foreign Application Priority Data

| | | | |
|---|---|---|---|
| Jul. 30, 1986 | [JP] | Japan | 61-177791 |
| Jul. 30, 1986 | [JP] | Japan | 61-177792 |
| Aug. 7, 1986 | [JP] | Japan | 61-184235 |
| Aug. 7, 1986 | [JP] | Japan | 61-184236 |
| Aug. 7, 1986 | [JP] | Japan | 61-184237 |
| Nov. 20, 1986 | [JP] | Japan | 61-275242 |
| Jan. 14, 1987 | [JP] | Japan | 62-004898 |

[51] Int. Cl.$^4$ ........................ C09D 11/12; C03C 17/00

[52] U.S. Cl. ........................................ 106/31; 106/32; 523/160; 523/161

[58] Field of Search ............................. 106/31, 32, 20; 523/160, 161

[56] References Cited

U.S. PATENT DOCUMENTS

| | | | |
|---|---|---|---|
| 4,128,430 | 12/1978 | Newman et al. | 106/31 |
| 4,304,601 | 12/1981 | Sharp | 106/30 |
| 4,553,865 | 11/1985 | Ikeda et al. | 400/198 |

FOREIGN PATENT DOCUMENTS

| | | | |
|---|---|---|---|
| 1046267 | 10/1983 | U.S.S.R. | 523/160 |

*Primary Examiner*—Theodore Morris
*Attorney, Agent, or Firm*—Fitzpatrick, Cella, Harper & Scinto

[57] ABSTRACT

In a semi-solid ink to be used in the heat transfer recording method in which a semi-solid ink is heated to melt to flow out through passage holes and said semi-solid ink flowed out is transferred onto a recording medium, it has a viscosity of 100 to 10000 cps as measured by means of a cone disc rotatory viscometer under the conditions of a temperature of 25° C. and a shear rate of 2000 $S^{-1}$.

16 Claims, 5 Drawing Sheets

SEMI-SOLID INK

BACKGROUND OF THE INVENTION

1. Field of the Invention

This invention relates to a semi-solid ink, above all a semi-solid ink to be applied for the heat transfer recording method such as image processor, electronic typewriter, facsimile or various information boards, etc.

2. Related Background Art

Presently, a thermal transferable material, which is laminated with an ink layer on a base film, has been generally employed for a heat transfer recording method, and recording is generally performed by interposing the thermal transferable material between a recording medium such as paper and a thermal head, and heating the thermal transferable material to melt the ink at the heated portion and setting the melted ink onto the recording medium. However, in applying a heat transfer recording method of the above thermal transferable material, there are some complications of a device constitution such as installation of thermal transferable material supply mechanism in a recording device and also running cost is high, since the thermal transferable material cannot be reused, and further, disposal of the thermal transferable material used was cumbersome.

Against the drawbacks as mentioned above, the filmless heat transfer method employing no base film has been proposed, for example, as disclosed in U.S. Pat. No. 4,561,789. In this method, in place of holding ink on base film, semi-solid ink is kept in a recording head having passage holes, said ink is permitted to flow out through passage holes by heating and melting said ink, and the ink is set onto a recording medium such as paper to effect transfer recording, and many advantages are there such as no consumption of base film as compared with conventional heat transfer recording method, and further good energy efficiency, due to direct heating the ink without through film.

FIG. 1 shows an example of a recording head used in the filmless heat transfer recording method as disclosed in U.S. Pat. No. 4,561,789.

As shown in the drawing, the semi-solid ink 23 is kept in the recording head 1. Here, 2 is a housing and 24 is a heat-generater for heating and melting the semi-solid ink. The heat-generater 24 has passage holes 24*a* for permitting the ink 23 melted by heating to flow out. 9 is a recording paper as a recording medium, 10 is a platen roller for conveying the recording paper 9. On the semi-solid ink 23, a pressure 11 may be applied for the purpose of facilitating flow-out or supply of the ink 23, if desired.

In the above constitution, when heat is generated at the heat-generater 24, the semi-solid ink 23 in the vicinity of said heat-generater is melted and softened to be lowered in viscosity, whereby the melted ink 23*a* flows out through the above passage holes 24*a*. In each heat-generater 24 of the recording heads 1 in an arrayed form these passage holes 24*a* are provided and by applying selectively heat-generating signals on each respective heat-generaters, desired images such as letters or images are formed on the recording paper 9. The temperature during recording is generally made about 40° to 120° C.

The semi-solid ink to be used in such filmless heat transfer recording method is desired to be melted when heated, not to flow out from passage holes before heating and also readily to be supplied. In the prior art, however, the ink melted by heating may sometimes flow out in a large amount through passage holes to cause "fog" or "tailing" on the images formed. On the contrary, also the ink may flow out insufficiently to cause "defect" in the formed images, whereby formed images become unclear.

SUMMARY OF THE INVENTION

The present inventors have studied intensively in order to solve the above problems and consequently accomplished the present invention by paying attention to the viscosity of the semi-solid ink, particularly the viscosity around ordinary temperature, and an object of the present invention is to provide a semi-solid ink to be used for the filmless heat-transfer recording method capable of giving sharp images excellent in response to recording signals, and also without occurrence of tailing, fog, etc.

According to the present invention, there is provided, a semi-solid ink to be used in the heat transfer recording method in which the semi-solid ink is heated to melt and to flow out through passage onto recording medium, said semi-solid ink having a viscosity of 100 to 10000 cps as measured by means of a cone disc rotatory viscometer under the conditions of a temperature of 25° C. and a shear rate of 2000 $S^{-1}$.

DETAILED DESCRIPTION OF THE INVENTION

The semi-solid ink of the present invention is generally constituted mainly of a heat-fusible binder and, if necessary, a softening agent and a colorant.

Here, semi-solid refers to the state which maintains solidness to the extent that the ink will not be flowed out through ink passage hole at ordinary temperature, and any ink either in the form of a paste or of high viscosity can be used as the semi-solid ink, so far as that such solidness can be maintained.

The semi-solid ink of the present invention is required to be easily softened to flow out in an appropriate amount through passage hole corresponding to the heat generated by recording signals. For this purpose, the semi-solid ink of the present invention should have a viscosity of 100 to 10000 cps as measured by a cone disc rotatory viscometer as exemplified in FIG. 6 under the conditions of a temperature of 25° C. and a shear rate of 2000 $S^{-1}$, more preferably 200 to 5000 cps. If the viscosity at 25° C. is less than 100 cps, the ink will flow out through the ink passage hole, even if no heat is applied. On the other hand, if the viscosity at 25° C. is more than 10000 cps, the ink will flow out through the ink passage hole with difficulty, whereby printing defect occurs.

The semi-solid ink within the above viscosity range should further preferably have a viscosity of 1 to 500 cps, more preferably 5 to 300 cps, under the conditions of a temperature of 120° C. and a shear rate of 2000 $S^{-1}$.

Figure 6:
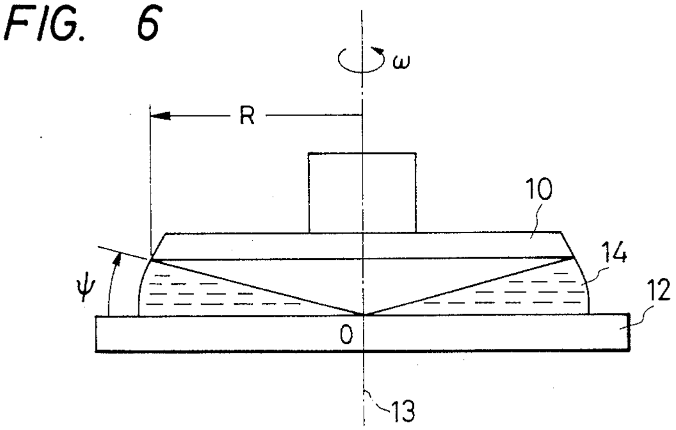
FIG. 6 is a schematic sectional view for illustration of an example of the cone disc rotatory viscometer.

The cone disc viscometer to be used in the present invention, of which an example is shown in FIG. 6, performs viscosity measurement of a sample 14 (in this case, the semi-solid ink) by filling the sample 14 between the cone disc 10 and the plate 12 and rotating the cone disc 10, which is generally used for measurement of viscosity of a Bingham plastic material or pseudoplastic material.

During viscosity measurement by this cone disc viscometer, the angle between the cone surface of the cone disc 10 and the plate 12 is represented by radian. The angle Ψ is generally made 20° to 3°, and for measurement a small amount, sample, 1 ml or less, is generally used.

Now, to calculate the shear rate D of the sample at a distance of r from the rotational axis 13, with the rotational angular velocity of the cone disc being made ω, the following relationship Ψ is valid:

$$D=(\text{linear velocity at point r})/(\text{distance from plate surface to point r})=r\omega/r\sin\Psi=\omega/\sin\Psi=\omega\Psi \quad \text{(I)}.$$

Here, if $\Psi \leqq 3$, since Ψ is a small angle in the above formula, the angle formed between the straight line connecting the point r and the point o and the plate surface approximates to Ψ, and also $\sin\Psi=\Psi$ is valid.

As is apparent from the formula (I), the shear rate D is related to only ω and the instrument constant Ψ, and becomes free from the distance r from the rotational axis within the sample. On the other hand, the shear stress τ is given by the following formula:

$$\tau=3P/2\pi R^3 \quad \text{(II)}$$

Here, R is the radius of the cone disc, P is the viscosity friction torque acting on the cone surface.

The viscosity η is the value as defined by $\eta=\tau/D$ according to the Newton's viscosity rule. Accordingly, it becomes as follows:

$$\eta=\tau/D=(3/2\pi R^3)(P/D) \quad \text{(III)},$$

and the viscosity η can be obtained from this equation (III) by measuring the viscosity friction torque.

When a τ-D flow curve is measured by the cone disc rotatory viscometer, it may sometimes indicate a curve with a concave shape in the D-axis direction, and this means a pseudo-plastic material. And, this flow curve is directed upwardly toward the right side, and when elongated to the left side, it intersects the axis of ordinate at D=0 above the original point, and one exhibiting flow behavior having such an intercept, namely a yield value, is a Bingham plastic material, and the semi-solid ink of the present invention also exhibits such behaviors as a Bingham plastic material or a pseudo-plastic material.

The components constituting the semi-solid ink of the present invention as described above are described in detail below. The melting point in the following description was measured according to the DSC method, and the melt viscosity was measured by means of the cone disc rotatory viscometer as shown in FIG. 6.

The heat-fusible binder to be used in the semi-solid ink of the present invention may comprise, for example, a wax and a napththenic hydrocarbon as suitably combined.

Specific examples of such wax may include natural waxes such as wood wax, whale wax, beeswax, lanolin, carnauba wax, canderilla wax, montan wax, cerresin wax, etc.; petroleum waxes such as paraffin wax, microcrystalline wax, etc.; synthetic waxes such as oxidized petrolatum, oxidized wax, ester wax, low molecular weight polyethylene wax, Fischer-Tropsch wax, etc.; higher fatty acids such as lauric acid, myristic acid, palmitic acid, stearic acid, behenic acid, etc.; higher alcohols such as stearyl alcohol, behenyl alcohol, etc. esters such as fatty acid ester of sucrose, fatty acid ester of sorbitane, etc.; rice wax, ozocerite, hardened castor oil, etc. These can be used either alone or as a combination of two or more kinds.

Among the above waxes, particularly preferable examples are those as shown below. That is, as the natural wax, beeswax, wood wax, lanolin, may be included.

As the paraffin wax, those having molecular weights of about 300 to 500, as exemplified by trade names such as HNP-1 produced by Nippon Seiro K.K. (m.p. 64.8° C.), HNP-3 (m.p. 64.2° C.), paraffin wax produced by Noda Wax K.K., etc. may be included.

As the microcrystalline wax, those having molecular weights of about 400 to 700, as exemplified by trade names such as HIMIC 1080 (m.p. 84° C.), HIMIC 1070 (m.p. 80° C.), produced by Nippon Seiro K.K., etc. may be included.

As the oxidized wax, there are NPS 6010 (m.p. 75° C.) produced by Nippon Seiro K.K., etc.

As the ester wax, there are NPS 6115 (m.p. 77° C.) produced by by Nippon Seiro K.K., etc.

As the oxidized petrolatum wax, there are HAD 5080 (softening point 76° C.), HAD 5090 (softening point 77° C., produced by Nippon Seiro K.K., etc.

As the fatty acid amide, Armide 0 (m.p. 68° C. ) produced by Lion Akzo K.K., etc. may be included.

As the wax to be used in the semi-solid ink of the present invention, those having melting points not higher than 130° C., particularly 40° to 120° C., are preferred. Furthermore, those having melt viscosity of 4 to 200 cps are preferred.

The naphthenic hydrocarbons to be used in the present invention are preferably those which are liquid at ordinary temperature and of non-volatile. Volatile naphthenic hydrocarbons, after the ink is stored for a long term, will be evaporated, whereby the fluidity of the semi-solid ink at ordinary temperature may be sometimes lost to cause troubles in supplying ink. Also, when heat-mixing is employed during ink preparation, naphthenic hydrocarbons will be evaporated, whereby many inconveniences such as unstable supply of products, and so on, may be occurred.

And, the above naphthenic hydrocarbon may preferably have a viscosity of 2000 cps or lower at 40° C., more preferably 500 cps or lower.

Specific examples of such naphthenic hydrocarbons may include fluid paraffins, etc.

For obtaining the semi-solid ink of the present invention, the above waxes and the naphthenic hydrocarbons are required to be contained at proportions of 10 to 70 wt. % for wax, 30 to 90 wt. % for naphthenic hydrocarbon, more preferably 20 to 50 wt. % for wax and 50 to 80 wt. % for naphthenic hydrocarbon.

When the wax is less than 10 wt. %, or when the naphthenic hydrocarbon exceeds 90 wt. %, the viscosity of the semi-solid ink at ordinary temperature is so low that the ink will flow out through the passage hole before heating with a heat-generator. On the other hand, if the wax exceeds 70 wt. %, or when the naphthenic hydrocarbon is less than 30 wt. %, viscosity of the semi-solid ink at ordinary temperature is so high that troubles are caused in supplying ink.

Also, in place of the above naphthenic hydrocarbon, a modified silicone oil can be used.

Specific examples of such modified silicone oils may include alcohol modified silicone oils, amino modified silicone oils, alkyl modified silicone oils, epoxy modified silicone oils, carboxyl modified silicone oils, fluorine modified silicone oils, polyether modified silicone oils, amide modified silicone oils, carnauba modified silicone oils, higher fatty acid modified silicone oils, mercapto modified silicone oils, radical reactive modified silicone oils, alkylaralkyl modified silicone oils, epoxy polyether modified silicone oils, etc. These can be used either alone or as a mixture of two or more kinds.

The modified silicone oil to be used in the semi-solid ink of the present invention should preferably have a viscosity of 2500 cps or lower, at 25° C., more preferably 500 cps or lower.

These modified silicone oils are extremely useful for the semi-solid ink of the present invention, since excellent, miscibility, reactivity or absorptivity, etc. for waxes can be exhibited depending on the modifying group. Also, since the modified silicone oil contains substantially no volatile matter, fluidity of the ink will not be impaired even when stored for a long time, thus the modified silicone oil bestows excellent storage stability on the semi-solid ink of the present invention.

For obtaining the semi-solid ink of the present invention, also when employing the above modified silicone oil, the wax and the modified silicone oil are required to be contained in the semi-solid ink at proportions of 10 to 70 wt. % for the wax and 30 to 90 wt. % for the modified silicone oil, more preferably 20 to 50 wt. % for the wax and 50 to 80 wt. % for the modified silicone oil.

Further, as the heat-fusible binder to be used in the present invention, the wax as described above and the paraffinic hydrocarbon may be suitable combined.

The paraffinic hydrocarbon to be used in the solid ink of the present invention may include specifically n-paraffin, iso-paraffin, polybutene and the like. These can be used either alone or as a combination of two or more kinds.

The paraffinic hydrocarbon to be used in the present invention is required to be liquid at ordinary temperature, having preferably a boiling point of 150° C. or higher. If the boiling point is lower than 150° C., when the ink is stored for a long term, the paraffinic hydrocarbon will be evaporated so as to impair fluidity of the semi-solid ink at ordinary temperature, whereby troubles may sometimes occur in supplying ink. Also, when heat mixing employed during ink preparation, the paraffinic hydrocarbon will be evaporated, whereby many inconveniences such as unstable supply of products, etc. may be occur.

For obtaining the semi-solid ink of the present invention, also when employing the paraffinic hydrocarbon, the waxes and the paraffinic hydrocarbons are required to be used in the semi-solid ink at proportions of 10 to 70 wt. % for the wax and 30 to 90 wt. % for the paraffinic hydrocarbon, more preferably 20 to 50 wt. % for the wax and 50 to 80 wt. % for the paraffinic hydrocarbon.

The semi-solid ink of the present invention can further contain, in addition to the above waxes, the naphthenic hydrocarbons, the modified silicone oil or the paraffinic hydrocarbon which is liquid at normal temperature, colorants, various solvents such as solvents serving as softening agents, etc., if desired.

The semi-solid ink containing the waxes, the naphthenic hydrocarbons, the modified silicone oils or the paraffinic hydrocarbons which are liquid at ordinary temperature can be used for the recording of various information plates, as a matter of course, and also as peelable ink which is also erasable.

The above semi-solid ink, by using the naphthenic hydrocarbon (particularly non-volatile naphthenic hydrocarbon), the modified silicone oil (particularly modified silicone oil substantially free from volatiles) or the paraffinic hydrocarbon which is liquid at room temperature (particularly high boiling paraffinic hydrocarbon), is excellent in storage stability without change in ink characteristics after storage for along time.

The semi-solid ink of the present invention may also comprise a heat-fusible petroleum resin as the binder which is softened with addition of a solvent, further a colorant dispersed or dissolved therein. In this case, by controlling the formulation ratio of the petroleum resin to the solvent, viscosity at ordinary temperature and melt viscosity are controlled. When petroleum resin is used as the binder, the content of the petroleum resin may be preferably 50 to 95 wt. % based on the total ink amount.

Here, petroleum resins means the resins obtained by polymerization of distillates containing much unsaturated hydrocarbons by-produced in the steps of petroleum refining and petrochemical industry. They are classified depending on molecular structures or starting monomers into various kinds of aromatic, aliphatic, alicyclic, copolymeric system, etc. and trade names thereof include those shown below, respectively.

For example, aromatic petroleum resins may include Nisseki Neopolymer S, T, E-100, GS, 170S, 160, 150, 140, 120, L-90 produced by Nippon Gosei Jushi K.K., Petroresins S, #80, #100, #120, #130, #150, etc., produced by Mitsui Sekiyu Kagaku Kogyo K.K.; aliphatic petroleum resins may include Highlets G-100X, T-100X, C-110X, R-100X, produced by Mitsui Sekiyu Kahaku Kogyo K.K.; Crayton A-100, B-170, C-100, D-100, M-100, N-180, U-185, etc., produced by Nippon Zeon K.K.; and alicyclic petroleum resins may include Alcon P-70, P-90, P-100, P-115, P-125, M-90, M-100, etc., produced by Arakawa Kagaku Kogyo K.K.

The above petroleum resin may be used either alone or as a mixture of two or more kinds, and is softened with a solvent to an appropriate viscosity.

The above solvents may be exemplified by hydrocarbons such as naphtha, kerosine, fluid paraffin, xylene, benzene, toluene, cyclohexane, etc.; halogenated hydrocarbons such as chloroform, carbon tetrachloride, etc.; alcohols such as methanol, ethanol, IPA, butanol, etc.; ethers such as ethyl ether, n-hexyl ether, tetrahydrofuran, etc.; acetal; ketones such as acetone, MEK, MIBK, etc.; esters such as n-butyl acetate, ethyl acetate, etc.; ethyl cellosolve, phenyl cellosolve, methyl cellosolve, polyhydric alcohols and their derivatives such as diethylene glycol monomethyl ether, etc.; other organic solvents, or plasticizers, mineral oils, animal or vegetable oils, etc.

Further, as the above petroleum resin, the semi-solid ink of the present invention can also use a resin containing coumarone or indene or their copolymer.

As the preferble resin containing coumarone or indene or their copolymer are thermoplastic resins obtained by polymerization or copolymerization of coumarone

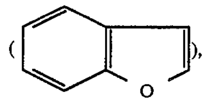

indene

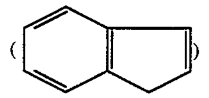

and styrene

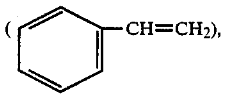

which are obtained from a solvent naphtha in the light oil of the coke furnace gas as a starting material by using of a catalyst such as $BF_3$, $H_2SO_4$, $AlCl_3$, etc.

Specifically, there may be included those represented by the following formula:

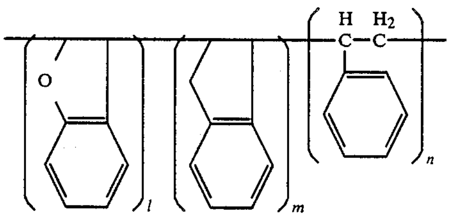

wherein l is an integer of 0 to 20, m is an integer of 0 to 25, n is an integer of 0 to 28, l and m cannot be 0 at the same time having preferably average molecular weight of 300 to 2500. As commercially available products, Nittetsu Coumarone G-90, T-120, etc. (Shin-Nittetsu Kagaku K.K.) may be included.

Examples of the solvent to be used with the above resin may include organic solvents such as kerosine, fluid paraffin, benzene, toluene, xylene, solvent naphtha, mineral spirit, n-butyl alcohol, benzyl alcohol, glycerine, ethyl acetate, diethyl ether, dioxane, furfural, acetone, methyl ethyl ketone, methyl isobutyl ketone, cyclohexanone, carbon tetrachloride, chloroform, polyhydric alcohols and their derivatives such as methyl cellosolve, ethyl cellosolve, phenyl cellosolve, diethylene glycol monomethyl ether, etc., or oil agents such as mineral oils, animal or vegetable oils, etc.

When a petroleum resin is used as the binder of the semi-solid ink of the present invention, when recording is effected on the so called white board or electronic blackboard sheet having a inpenetrable surface with relatively poor wettability such as of fluorine resin, silicone resin, polyethylene terephthalate, polyethylene, polypropylene, etc., other than recording paper, the recording can be easily erased by rubbing with a known blackboard eraser a paper or a cloth.

The colorant to be used in the present invention may include any dye or pigment known in the art without limitation, including, for example, carbon black, iron oxide powder, nigrosine dye, Lamp Black, Sudan Blue, Alkali Blue, Fast Yellow G, Benzine Yellow, Pigment Yellow, Indo-fast Orange, Irgadine Red, Para-nitro Aniline Red, Toluidine Red, Carmine FB, Permanent Bordeaux FRR, Pigment Orange R, Resole Red 20, Lake Red C, Rhodamine FB, Rhodamine B Lake, Methyl Violet B Lake, Phthalocyanine Blue, Pigment Blue, Brilliant Green B, Phthalocyanine Green, Oil Yellow GG, Zabon Fast Yellow CGG, Kayaset Y963, Kayaset YG, Sumiplast Yellow GG, Zabon Fast Orange RR, Oleyl Scarlet, Sumiplast Orange G, Orzaole Brown B, Zabon Fast Scarlet CG, Eizenspicon Red BEH, Oil Pink OP, Victoria Blue F4R, Fastgen Blue 5007, Sudan Blue, Oil Peacock Blue, etc. These colorants can be used either alone or as a mixture of two or more kinds, and contained in the above ink preferably in an amount ranging from 1 to 40 wt. %.

The semi-solid ink of the present invention is required to be softened by sufficient transmission of heat through the ink when heated. For this purpose, when the thermal conductivity of the semi-solid ink of the present invention is made more than $1.5\times10^{-4}$ [$cal\cdot cm^{-1}\cdot sec^{-1}\cdot deg^{-1}$], response to heating can be increased so as to effect a short recording time. The thermal conductivity of the semi-solid ink of the present invention is practically preferred to be $1.5\times10^{-4}$ to $9.7\times10^{-2}$ [$cal\cdot cm^{-1}\cdot sec^{-1}\cdot deg^{-1}$].

In the present invention, thermal conductivity of the semi-solid ink was determined by measurement under the seady state, using the parallel plate type cell of Michels et al (Course of Experimental Chemistry, Continuation 1, edited by Chemical Society of Japan, P. 413–415, P. 423–425). Shortly speaking, the ink of which thermal conductivity is to be measured is inserted between a high temperature plate and a low temperature plate placed in parallel to each other and the high temperature plate is heated, whereby heat flows through the ink so that heat reaches to the low temperature plate. After obtaining a steady flow of heat, heat conductivity can be measured.

The method for preparing the semi-solid ink of the present invention is not particularly limited. But, for example, the components may be melted by heating to be sufficiently mixed, followed by cooling. More specifically, the wax is heated to melt to 50° to 200° C., preferably 100° to 150° C., and the naphthenic hydrocarbon, the modified silicone oil or the paraffinic hydrocarbon, and further colorant and other additives are added, and then thoroughly mixed and/or dispersed, and cooled to room temperature stationarily or under stirring.

Also, when a semi-solid ink containing a petroleum resin such as coumarone or indene or their copolymer is produced, the petroleum resin is heated to melt to a temperature of 70° to 350° C., preferably 100° to 250° C., and the above solvent and colorant, etc. are mixed therewith to prepare the ink.

Next, the recording method using the semi-solid ink of the present invention is to be described.

Figure 1:
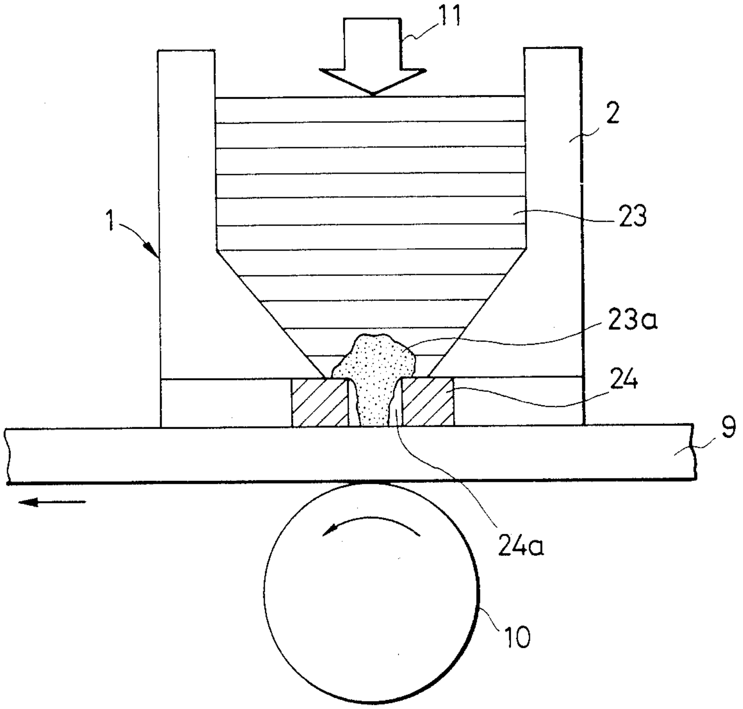
FIG. 1 is a schematic sectional view of an example of the recording head to be used for the filmless transfer recording method.
Figure 2:
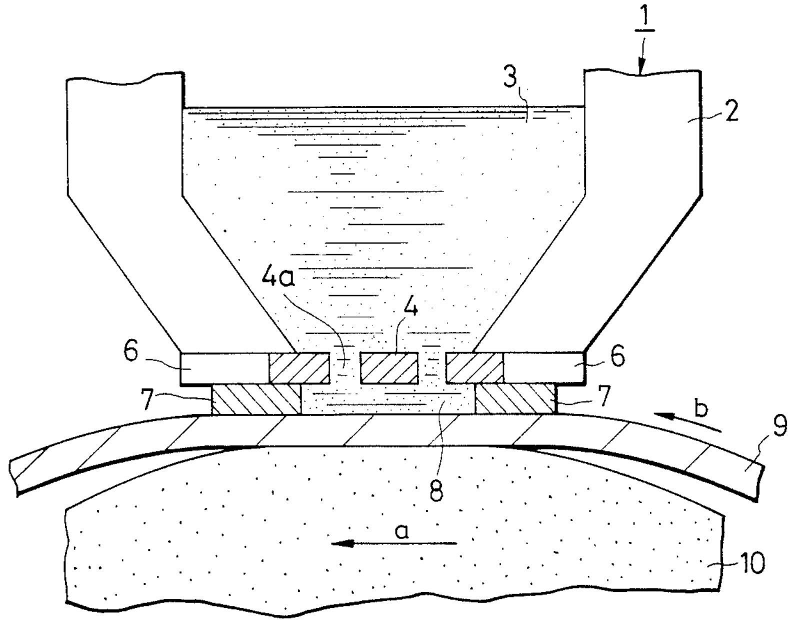
FIG. 2 is a schematic sectional view of another example of the recording head to be used for the filmless transfer recording method.
Figure 3:
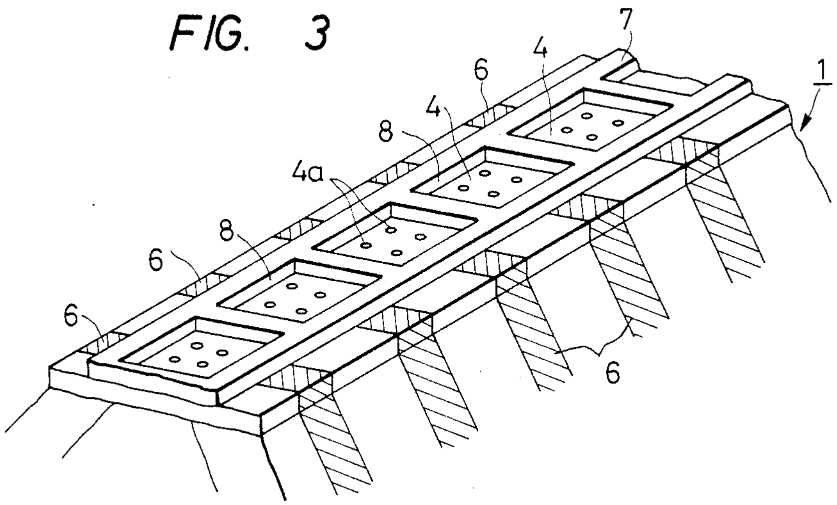
FIG. 3 is an appearance view of the multitype head in which the recording portions of the recording head in FIG. 2 are arrayed in a line.

The semi-solid ink of the present invention can perform transfer recording on the recording paper by means of a recording head as shown in FIG. 1, and it can be applied employed for the recording method as shown in FIG. 2 through FIG. 4.

In FIG. 2, 1 is a recording head, which is designed to house the semi-solid ink 3 of the present invention which maintains high viscosity as a semi-solid at ordinary temperature within the housing 2, but is lowered in viscosity at higher temperature.

At a part of the above housing 2, heat-generaters 4 are arranged in a plural number in an array as shown in FIG. 3. Each heat-generater 4 is perforated with ink passage holes 4*a* comprising a desired number (4 in this example) of thru-holes. When employing the semi-solid ink of the present invention, the diameter of the ink passage hole 4*a* should be preferably about 0.1 to 0.5 mm.

Also, each heat-generater 4 is connected with an electrode 6 capable of current passage corresponding to the image signal, then by applying voltage selectively on said electrode 6, the above heat-generater will individually generate heat.

Further, on the above heat-generater 4 is provided a frame-shaped window 7, as shown in FIG. 3.

Recording by use of the above recording head 1 is practiced by contacting the window 7 onto the recording paper 9 which is the recording medium, while conveying the recording paper 9 by means of the platen roller rotating in the direction of the arrowhead a.

Such recording is described in detail by referring to FIG. 4.

First, when a voltage is applied on the heat-generater 4 through the electrode 6, said heat-generater generates heat to heat the semi-solid ink 3 in the vicinity of said heat-generater. Since this ink has a high viscosity at ordinary temperature, it will not pass through the ink passage hole 4*a*, but is lowered in viscosity when heated as mentioned above, whereby it becomes passable through the ink passage hole 4*a*. As the heat-generater 4, a carbon sheet or a ruthenium oxide, etc. is generally employed.

The ink 3 which has passed through the ink passage hole 4 as described above is spread within the ink reservoir 8, and is returned again to semi-solid or the state approximate thereto by radiation. Then, when a static pressure higher than an external pressure is applied in the housing 2, passage of the ink 3 can be preferably accelerated. In the case of using the semi-solid ink of the present invention, the pressure to be applied should be preferably higher by 0.1 to 2.0 kg/cm$^2$ than the external pressure.

Figure 4A:
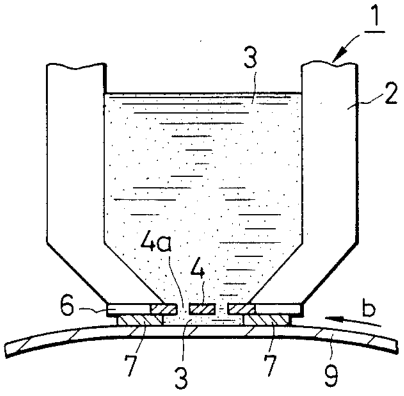
FIGS. 4A to 4D are schematic illustrations of the recording steps by use of the recording head shown in FIG. 2.
Figure 4B:
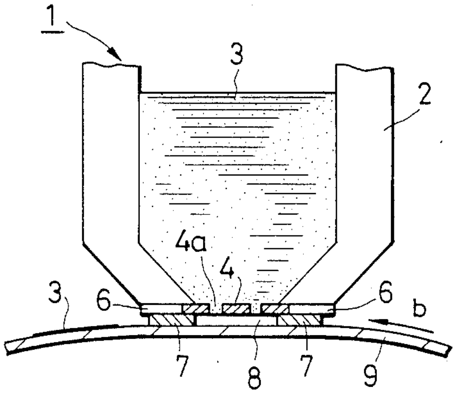
Figure 4C:
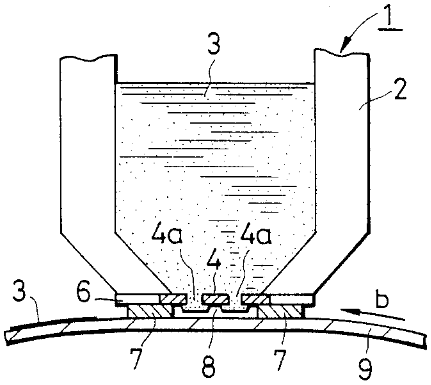
Figure 4D:
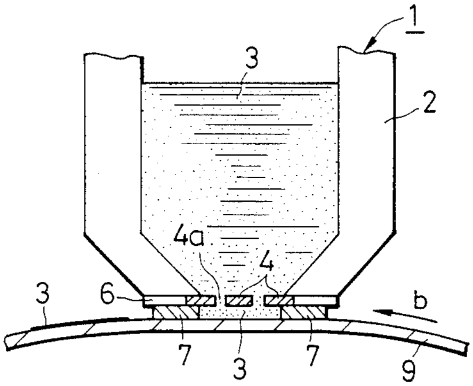

Next, when a voltage is applied on the heat-generater corresponding to the image signal, the heat-generater generates heat selectively (the state shown in FIG. 4A), whereby the semi-solid ink 3 within the ink reservoir 8 is peeled off from the ink reservoir 8 to be transferred onto the recording paper 9 which travels in the direction of the arrowhead b (the state shown in FIG. 4B). Further, when the ink reservoir 8 becomes vacant by the above transfer, the ink 3 in the housing 2 is supplemented through the ink passage hole 4*a* into the ink reservoir 8 (the state shown in FIG. 4C), whereby the ink is semi-solidified by radiation in the ink reservoir 8 as described above (the state shown in FIG. 4D). When the semi-solid ink of the present invention is heated, the ink temperature should be preferably about 70° to 150° C.

By repeating the above steps corresponding to image signals, recorded dots are continuously formed on the recording paper 9 corresponding to the sizes within the above ink reservoir 8, thus ink images are transferred.

Figure 5A:
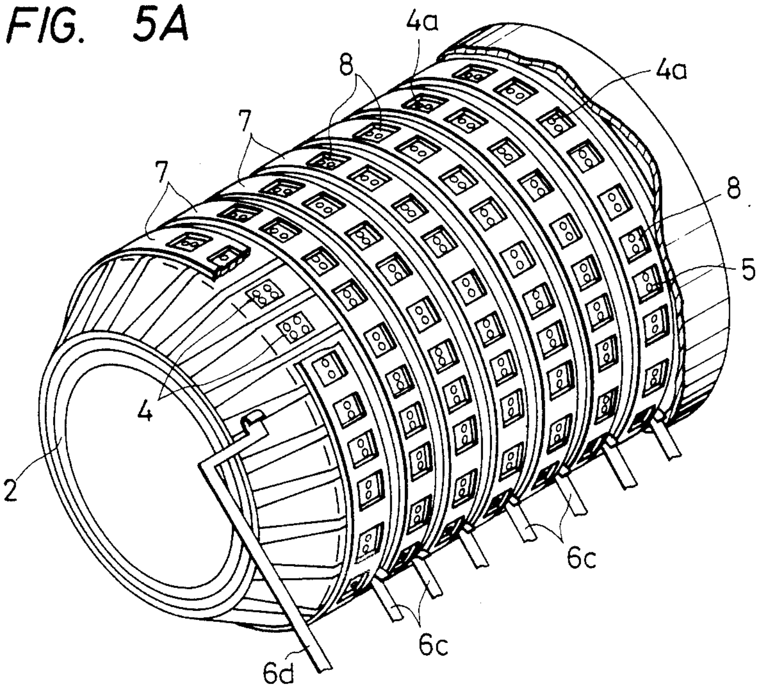
FIGS. 5A and 5B are illustrations of the rotatory type recording head.
Figure 5B:
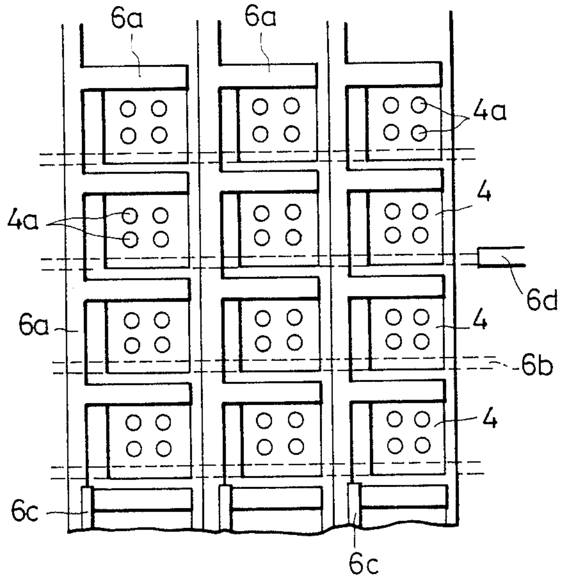

Further, in recording using the semi-solid ink of the present invention, a rotatory system recording as shown in FIG. 5 may be used, and also the number of ink passage holes is not particularly limited to 4 as shown in FIG. 3, but any desired number may be used, as a matter of course.

The recording head 1 as shown in FIG. 5 has a plural number of heat-generater 4 arranged as divided respectively in the longer direction and the circumferential direction of the cylindrical housing 2 capable of housing the semi-solid ink 3 internally thereof, and provides the window 7 on said heat-generater 4 to constitute the ink reservoir 8, whereby it is made rotatable in said circumferential direction (FIG. 5A). Also, the above heat-generater 4 is connected with the signal electrode 6*a* and the earth electrode 6*b* so that the respective electrodes 6*a*, 6*b* may be contacted with brushes 6*c*, 6*d*, respectively.

Accordingly, when voltage pulses corresponding to image signals are applied on the respective brushes 6*c*, 6*d*, the heat-generater 4 in contacting with the earth brush 6d generates heat selectively to transfer the semi-solid ink.

As described above, the semi-solid ink of the present invention has an appropriate melt viscosity and therefore, when the semi-solid ink of the present invention is used for the filmless recording method in which recording is effected by passage through ink passage holes by heating, no excessive ink will flow out through the passage holes, nor on the contrary passage of flow-out of the ink is insufficient when heat is applied. Consequently, the semi-solid ink of the present invention is free from occurrence of "fog", "tailing" or "defect".

In the following Examples, viscosity was measured by means of a cone disc rotatory viscometer as shown in FIG. 6 (produced by Haake AG, East Germany).

EXAMPLE 1

Thirty (30) parts by weight of a synthetic wax (HNP-3, produced by Nippon Seiro K.K., m.p. 64.2° C.) as the heat-fusible binder, 60 parts by weight of a polybutene (Nisseki Polybutene LV-10, produced by Nippon Sekiyu Kagaku K.K.) as the softening agent for the binder and 5 parts by weight of Oil Scarlet as the colorant were added together with glass beads of 1.5 mm diameter into a single cylinder type sand mill maintained at 140° C., and after dispersed and mixed by rotating this at 2000 rpm for 30 minutes, the beads were separated and the mixture cooled to obtain a semi-solid ink.

The viscosity of the ink was measured by means of a cone disc rotatory viscometer under the conditions of a temperature of 25° C. and a shear rate of 2000 $S^{-1}$ to be 290 cps. On the other hand, the viscosity at a temperature of 120° C. and a shear rate of 2000 $S^{-1}$ was found to be 9 cps.

The recording characteristics of this ink were evaluated by performing transfer recording onto a recording paper by use of a recording head as exemplified in FIG. 1. The heat-generator of the recording head was made a carbon sheet, and Joule's heat was generated on the heat-generater by applying potential pulses of 5 to 30 V on the electrodes connected to the carbon sheet, thereby melting by heating the ink in the vicinity thereof effected recording. During recording, a pressure of 0.1 to 2.0 kg/cm$^2$ was applied in the direction of the passage hole for the ink constantly or synchronized with the potential pulses. When recording was thus performed, recording dots were recorded in response to potential pulses with high sensitivity, whereby sharp recorded images were obtained on the recording paper without tailing as a matter of course, and also without fog, defect, etc.

EXAMPLE 2

A semi-solid ink was obtained in the same manner as in Example 1 except for using 30 parts by weight of a polyamide resin (HT-W-60, produced by Sanwa Kagaku K.K., m.p. 70° C.) as the heat-fusible binder, 30 parts by weight of a polybutene (Nisseki Polybutene HV-50 produced by Nippon Sekiyu Kagaku K.K.) as the softening agent and 5 parts by weight of Oil Scarlet as the colorant.

When the viscosity of this ink was determined in the same manner as in Example 1, it was found to be 500 cps at a temperature of 25° C. and a shear rate of 2000 $S^{-1}$, while it was 14 cps at a temperature of 120° C. and a shear rate of 2000 $S^{-1}$.

When the recording characteristics of this ink were evaluated in the same manner as in Example 1, sharp recorded images were obtained on the recording paper without tailing as a matter of course, and also without fog, defect, etc.

EXAMPLE 3

A semi-solid ink was obtained in the same manner as in Example 1 except using 10 parts by weight of a oxidized paraffin wax (H-10, produced by Mitsui Sekiyu Kagaku K.K., m.p. 70° C.) as the heat-fusible binder, 30 parts by weight of a polybutene (Nisseki Polybutene LV-50, produced by Nippon Sekiyu Kagaku K.K.) as the softening agent and 5 parts by weight of Oil Scarlet as the colorant.

When the viscoisty of this ink was determined in the same manner as in Example 1, it was found to be 150 cps at a temperature of 25° C. and a shear rate of 2000 $S^{-1}$, while it was 20 cps at a temperature of 120° C. and a shear rate of 2000 $S^{-1}$.

When the recording characteristics of this ink were evaluated in the same manner as in Example 1, sharp images were recorded on the recording paper without tailing as a matter of course, and also without fog, defect, etc.

COMPARATIVE EXAMPLE 1

A semi-solid ink was obtained in the same manner as in Example 1 except that the mixing ratio was changed to 5 parts by weight of the synthetic wax, 80 parts by weight of the Nisseki Polybutene LV-10 and 5 parts by weight of Oil Scarlet.

When the viscosity of this ink was determined in the same manner as in Example 1, it was found to be 20 to 30 cps at a temperature of 25° C. and a shear rate of 2000 $S^{-1}$, while it was 4 cps at a temperature of 120° C. and a shear rate of 2000 $S^{-1}$.

When the recording characteristics of this ink were evaluated in the same manner as in Example 1, tailing and fog were observed in the recorded images, which were also indistinct.

COMPARATIVE EXAMPLE 2

A semi-solid ink was obtained in the same manner as in Example 2 except that the mixing ratio was changed to 80 parts by weight of the polyamide resin, 5 parts by weight of the Nisseki Polybutene HV-10 and 5 parts by weight of Oil Scarlet.

When the viscosity of this ink was determined in the same manner as in Example 1, it was found to be 20000 to 30000 cps at a temperature of 25° C. and a shear rate of 2000 $S^{-1}$, while it was 40 to 50 cps at a temperature of 120° C. and a shear rate of 2000 $S^{-1}$.

When the recording characteristics of this ink were evaluated in the same manner as in Example 1, tailing and fog were observed in the recorded images, which were also indistinct.

EXAMPLE 4

Thirty (30) parts by weight of an oxidized petrolatum (WEISSEN 0453, produced by Nippon Seiro K.K.), 60 parts by weight of methyl cellosolve (Methyl Cellosolve, produced by Kishida Kagaku K.K.) as the softening agent for this binder and 5 parts of iron oxide powder as the colorant were added together with glass beads of 1.5 mm diameter into a single cylinder type sand mill maintained at 140° C., and after dispersed and mixed by rotating this at 2000 rpm for 30 minutes, the beads were separated and the mixture cooled to obtain a semi-solid ink.

The viscosity of the semi-solid ink was found to be 750 cps under the conditions of a temperature of 25° C. and a shear rate of 2000 $S^{-1}$, and 40 cps under the conditions of a temperature of 120° C. and a shear rate of 2000 $S^{-1}$. The thermal conductivity of this ink was measured by means of a known thermal conductivity measuring instrument (Model HR-100, produced by Tokai Giken K.K.) to be $5.2\times10^{-4}$ [cal $cm^{-1}$ $sec^{-1}$ $deg^{-1}$] at 25° C.

The recording characteristics of this ink were evaluated by performing transfer recording onto a recording paper by use of a recording head as exemplified in FIG. 1. The heat-generater of the recording head was made a carbon sheet, and Joule's heat was generated on the heat-generater by applying potential pulses of 5 to 30 V on the electrodes connected to the carbon sheet, thereby melting by heating the ink in the vicinity thereof effected recording. During recording, a pressure of 0.1 to 2.0 $kg/cm^2$ was applied in the direction of the passage hole for the ink constantly or synchronized with the potential pulses. When recording was thus performed, recording dots were recorded in response to potential pulses with high sensitivity, whereby sharp images were recorded on the recording paper without tailing as a matter of course, and also without fog, defect, etc.

EXAMPLE 5

A semi-solid ink was obtained in the same manner as in Example 4 except for using 30 parts by weight of a terpene phenol resin (Super Bekkasite 1001, produced by Dainippon Ink Kagaku K.K.), 60 parts by weight of a liquid polybutadiene (Nisseki Polybutadiene B-700, produced by Nippon Sekiyu Kagaku K.K.) and 5 parts by weight of iron oxide powder as the colorant.

The viscosity of the semi-solid ink was found to be 6500 cps under the conditions of a temperature of 25° C. and a shear rate of 2000 $S^{-1}$, and 260 cps under the conditions of a temperature of 120° C. and a shear rate of 2000 $S^{-1}$.

The thermal conductivity of this ink was measured in the same manner as in Example 4 to be $2.8\times10^{-4}$ [cal $cm^{-1}$ $sec^{-1}$ $deg^{-1}$] at 25° C.

When the recording characteristics of this ink were evaluated in the same manner as in Example 4, sharp images were recorded on the recording paper without tailing as a matter of course, and also without fog, defect, etc. similarly as in Example 4.

EXAMPLE 6

A semi-solid ink was obtained in the same manner as in Example 4 except for using 40 parts by weight of a white wax (deodorized purified white wax, produced by Noda Wax K.K.), 70 parts by weight of xylene (Xylene, produced by Kishida Kagaku K.K.) as the softening agent and 5 parts by weight of Phthalocyanine Blue as the colorant.

The viscosity of the semi-solid ink was found to be 900 cps under the conditions of a temperature of 25° C. and a shear rate of 2000 $S^{-1}$, and 31 cps under the conditions of a temperature of 120° C. and a shear rate of 2000 $S^{-1}$.

The thermal conductivity of this ink was measured in the same manner as in Example 4 to be $1.8\times10^{-1}$ [cal $cm^{-1}$ $sec^{-1}$ $deg^{-1}$] at 25° C.

When the recording characteristics of this ink were evaluated in the same manner as in Example 4, sharp images were recorded on the recording paper without tailing as a matter of course, and also without fog, defect, etc. similarly as in Example 4.

COMPARATIVE EXAMPLE 3

A semi-solid ink was obtained in the same manner as in Example 4 except that the oxidized petrolatum was changed to a styrene resin.

The thermal conductivity of this ink was measured in the same manner as in Example 4 to be $1.0\times10^{-4}$ [cal $cm^{-1}$ $sec^{-1}$ $deg^{-1}$] at 25° C.

The viscosity of this ink was found to be 220000 cps under the conditions of a temperature of 25° C. and a shear rate of 2000 $S^{-1}$.

When the recording characteristics of this ink were evaluated in the same manner as in Example 1, defects occurred in recorded images, and the images were indistinct as a whole.

COMPARATIVE EXAMPLE 4

A semi-solid ink was obtained in the same manner as in Example 5 except that the terpene phenol resin in Example 5 was changed to an AS resin (styrene-acrylic copolymer).

The thermal conductivity of this ink was measured in the same manner as in Example 4 to be 4 to $7\times10^{-6}$ [$cal\cdot cm^{-1}\cdot sec^{-1}\cdot deg^{-1}$] at 25° C.

The viscosity of this ink was found to be 55000 cps under the conditions of a temperature of 25° C. and a shear rate of 2000 $S^{-1}$ and 1300 cps under the conditions of a temperature of 120° C. and a shear rate of 2000 $S^{-1}$.

When the recording characteristics of the ink were evaluated in the same manner as in Example 4, defects occurred in recorded images, and the images were indistinct as a whole.

EXAMPLE 7

Thirty (30) parts by weight of a beeswax (Bleached Beeswax, produced by Noda Wax K.K., m.p. 60° C.) were heated to melt at 140° C., and then 60 parts by weight of a fluid paraffin (Crystol 70, produced by Esso Sekiyu K.K.) and 5 parts by weight of Irgadine Red were thoroughly mixed and dispersed therein to obtain a semi-solid ink.

The viscosity of the semi-solid ink was found to be 350 cps under the conditions of a temperature of 25° C. and shear rate of 2000 $S^{-1}$, and 10 cps under the conditions of a temperature of 120° C. and a shear rate of 2000 $S^{-1}$.

The recording characteristics of this ink were evaluated by performing transfer recording onto a recording paper by use of a recording head as exemplified in FIG. 1. The heat-generater of the recording head was made a carbon sheet, and Joule's heat was generated on the heat-generater by applying potential pulses of 5 to 30 V on the electrodes connected to the carbon sheet, thereby melting by heating the ink in the vicinity thereof effected recording. During recording, a pressure of 0.1 to 2.0 kg/$cm^2$ was applied in the direction of the passing hole for the ink constantly or synchronized with the potential pulses. When recording was thus performed, recording dots were recorded in response to potential pulses with high sensitivity, and no tailing or fog was observed on the recording paper. Also, the ink was found to have excellent storage stability without change in color or change in ink viscosity, etc. being observed even after storage for a long term.

EXAMPLE 8

A semi-solid ink was obtained in the same manner as in Example 7 except for changing the mixing ratio of the ink in Example 7 to 60 parts by weight of the beeswax, 40 parts by weight of the fluid paraffin and 5 parts by weight of Irgadine Red.

The viscosity of the semi-solid ink was found to be 6200 cps under the conditions of a temperature of 25° C. and a shear rate of 2000 $S^{-1}$, and 49 cps under the conditions of a temperature of 120° C. and a shear rate of 2000 $S^{-1}$.

When the recording characteristics of this ink were evaluated in the same manner as in Example 7 by use of the same recording head in Example 7 except changing the applied pressure on ink to 2.0 to 2.7 kg/$cm^2$, recorded dots could be recorded with high sensitivity in response to the potential pulses, to effect recording of high quality without tailing, fog, etc. on the recording paper.

EXAMPLE 9

A semi-solid ink was obtained in the same manner as in Example 7 except changing the mixing ratio of the ink in Example 7 to 25 parts by weight of the beeswax, 80 parts by weight of the fluid paraffin and 5 parts by weight of Irgadine Red.

The viscosity of the semi-solid ink was found to be 160 cps under the conditions of a temperature of 25° C. and a shear rate of 2000 $S^{-1}$, and 36 cps under the conditions of a temperature of 120° C. and a shear rate of 2000 $S^{-1}$.

When the recording characteristics of this ink were evaluated in the same manner as in Example 7 by use of the same recording head in Example 7 except changing the applied pressure on ink to 0.05 to 0.5 kg/$cm^2$, recorded dots could be recorded with high sensitivity in response to the potential pulses, to effect recording of high quality without tailing, fog, etc. on the recording paper.

EXAMPLE 10

A semi-solid ink was obtained in the same manner as in Example 7 except for using a polyethylene wax (Hiwax 400, produced by Mitsui Sekiyu Kagaku K.K., softening point 132° C.), and the recording characteristics of this ink were evaluated. The viscosity of the semi-solid ink was found to be 7900 cps under the conditions of a temperature of 25° C. and a shear rate of 2000 $S^{-1}$, and 440 cps under the conditions of a temperature of 120° C. and a shear rate of 2000 $S^{-1}$. The ink of this Example was substantially free from tailing, fog, etc., but response to the potential pulses was slightly slow.

COMPARATIVE EXAMPLE 5

A semi-solid ink was obtained in the same manner as in Example 7 except that the mixing ratio of the ink was changed to 10 parts by weight of the beeswax, 95 parts by weight of the fluid paraffin and 5 parts by weight of Irgadine Red.

The viscosity of this ink was found to be 65 cps under the conditions of a temperature of 25° C. and a shear rate of 2000 $S^{-1}$.

When the recording characteristics of this ink were evaluated in the same manner as in Example 7 by use of the same recording head in Example 7 except changing the applied pressure on ink to 0.01 to 0.2 $kg/cm^2$, response of the recorded dots to potential pulses was relatively good, but tailing, fog, etc. were observed on the recording paper.

COMPARATIVE EXAMPLE 6

A semi-solid ink was obtained in the same manner as in Example 7 except that the mixing ratio of the ink in Example 7 was changed to 75 parts by weight of the beeswax, 30 parts by weight of the fluid paraffin and 5 parts by weight of Irgadine Red.

The viscosity of this ink was found to be 14000 cps under the conditions of a temperature of 25° C. and a shear rate of 2000 $S^{-1}$.

When the recording characteristics of this ink were evaluated in the same manner as in Example 7 by use of the same recording head in Example 7 except for changing the applied pressure on ink to 1 to 10 $kg/cm^2$, response of the recorded dots to potential pulses was slow, and tailing and fog, etc. were observed on the recording paper.

EXAMPLE 11

Thirty (30) parts by weight of a beeswax (Bleached Beeswax, produced by Noda Wax K.K., m.p. 60° C.) were heated to melt at 140° C., and then 60 parts by weight of a higher fatty acid modified silicone oil (TSF 410, produced by Toshiba Silicone K.K.) and 5 parts by weight of Irgadine Red were thoroughly mixed and dispersed therein to obtain a semi-solid ink.

The viscosity of the semi-solid ink was found to be 480 cps under the conditions of a temperature of 25° C. and a shear rate of 2000 $S^{-1}$, and 20 cps under the conditions of a temperature of 120° C. and a shear rate of 2000 $S^{-1}$.

The recording characteristics of the ink were evaluated by performing transfer recording onto a recording paper by use of a recording head as exemplified in FIG. 1. The heat-generater of the recording head was made a carbon sheet, and Joule's heat was generated on the heat-generater by applying potential pulses of 5 to 30 V on the electrodes connected to the carbon sheet, thereby melting by heating the ink in the vicinity thereof effected recording. During recording, a pressure of 0.1 to 2.0 $kg/cm^2$ was applied in the direction of the passage hole for the ink constantly or synchronized with the potential pulses. When recording was thus performed, recording dots were recorded in response to potential pulses with high sensitivity, and no tailing or fog was observed on the recording paper. Also, the ink was found to have excellent storage stability without change in color or change in ink viscosity, etc. being observed even after storage for a long term.

EXAMPLE 12

A semi-solid ink was obtained in the same manner as in Example 11 except for changing the mixing ratio of the ink in Example 11 to 60 parts by weight of the beeswax, 40 parts by weight of the modified silicone oil and 5 parts by weight of Irgadine Red.

The viscosity of the semi-solid ink was found to be 2600 cps under the conditions of a temperature of 25° C. and a shear rate of 2000 $S^{-1}$, and 25 cps under the conditions of a temperature of 120° C. and a shear rate of 2000 $S^{-1}$.

When the recording characteristics of this ink were evaluated in the same manner as in Example 11 by use of the same recording head in Example 11 except for changing the applied pressure on ink to 2.0 to 2.7 $kg/cm^2$, recorded dots could be recorded with high sensitivity in response to the potential pulses, to effect recording of high quality without tailing, fog, etc. on the recording paper.

EXAMPLE 13

A semi-solid ink was obtained in the same manner as in Example 11 except for changing the mixing ratio of the ink in Example 11 to 25 parts by weight of the beeswax, 80 parts by weight of the modified silicone oil and 5 parts by weight of Irgadine Red.

The viscosity of the semi-solid ink was found to be 120 cps under the conditions of a temperature of 25° C. and a shear rate of 2000 $S^{-1}$, and 18 cps under the conditions of a temperature of 120° C. and a shear rate of 2000 $S^{-1}$.

When the recording characteristics of this ink were evaluated in the same manner as in Example 11 by use of the same recording head in Example 11 except for changing the applied pressure on ink to 0.05 to 0.5 $kg/cm^2$, recorded dots could be recorded with high sensitivity in response to the potential pulses, to effect recording of high quality without tailing, fog, etc. on the recording paper.

EXAMPLE 14

A semi-solid ink was obtained in the same manner as in Example 11 except for using a polyethylene wax (Hiwax 400, produced by Mitsui Sekiyu Kagaku K.K., softening point 132° C.), and the recording characteristics of this ink were evaluated. The viscosity of the semi-solid ink was found to be 6700 cps under the conditions of a temperature of 25° C. and a shear rate of 2000 $S^{-1}$, and 480 cps under the conditions of a temperature of 120° C. and a shear rate of 2000 $S^{-1}$. The ink of this Example was substantially free from tailing, fog, etc., but response to the potential pulses was slightly slow.

COMPARATIVE EXAMPLE 7

A semi-solid ink was obtained in the same manner as in Example 11 except that the mixing ratio of the ink was changed to 10 parts by weight of the beeswax, 95 parts by weight of the modified silicone oil and 5 parts by weight of Irgadine Red.

The viscosity of this ink was found to be 70 cps under the conditions of a temperature of 25° C. and a shear rate of 2000 $S^{-1}$.

When the recording characteristics of this ink were evaluated in the same manner as in Example 11 by use of the same recording head in Example 11 except for changing the applied pressure on ink to 0.01 to 0.2 kg/cm$^2$, response of the recorded dots to potential pulses was relatively good, but tailing, fog, etc. were observed on the recording paper.

COMPARATIVE EXAMPLE 8

A semi-solid ink was obtained in the same manner as in Example 11 except that the mixing ratio of the ink in Example 11 was changed to 75 parts by weight of the beeswax, 30 parts by weight of the modified silicone oil and 5 parts by weight of Irgadine Red.

The viscosity of this ink was found to be 12000 cps under the conditions of a temperature of 25° C. and a shear rate of 2000 $S^{-1}$.

When the recording characteristics of this ink were evaluated in the same manner as in Example 11 by use of the same recording head in Example 11 except for changing the applied pressure on ink to 1.0 to 9.5 kg/cm$^2$, response of the recorded dots to potential pulses was slow, and tailing and fog, etc. were observed on the recording paper.

EXAMPLE 15

Thirty (30) parts by weight of a rigid ester wax (NPS 6115, produced by Nippon Seiro K.K., m.p. 77° C.) were heated to melt at 140° C., and then 50 parts by weight of iso-paraffin (Nisseki Isozol 300, produced by Nisseki Kagaku K.K.) and 5 parts by weight of Irgadine Red were thoroughly mixed and dispersed therein to obtain a semi-solid ink.

The viscosity of the semi-solid ink was found to be 790 cps under the conditions of a temperature of 25° C. and a shear rate of 2000 $S^{-1}$, and 35 cps under the conditions of a temperature of 120° C. and a shear rate of 2000 $S^{-1}$.

The recording characteristics of this ink were evaluated by performing transfer recording onto a recording paper by use of a recording head as exemplified in FIG. 1. The heat-generater of the recording head was made a carbon sheet, and Joule's heat was generated on the heat-generater by applying potential pulses of 5 to 30 V on the electrodes connected to the carbon sheet, thereby melting by heating the ink in the vicinity thereof effected recording. During recording, a pressure of 0.1 to 2.0 kg/cm$^2$ was applied in the direction of the passage hole for the ink constantly or synchronized with the potential pulses. When recording was thus performed, recording dots were recorded in response to potential pulses with high sensitivity, and no tailing or fog was observed on the recording paper. Also, the ink was found to have excellent storage stability without change in color or change in ink viscosity, etc. being observed even after storage for a long term.

EXAMPLE 16

A semi-solid ink was obtained in the same manner as in Example 15 except changing the mixing ratio of the ink in Example 15 to 60 parts by weight of the rigid ester wax, 40 parts by weight of the iso-paraffin and 5 parts by weight of Irgadine Red.

The viscosity of the semi-solid ink was found to be 2000 cps under the conditions of a temperature of 25° C. and a shear rate of 2000 $S^{-1}$, and 180 cps under the conditions of a temperature of 120° C. and a shear rate of 2000 $S^{-1}$.

When the recording characteristics of this ink were evaluated in the same manner as in Example 15 by use of the same recording head in Example 15 except for changing the applied pressure on ink to 2.0 to 2.7 kg/cm$^2$, recorded dots could be recorded with high sensitivity in response to the potential pulses, to effect recording of high quality without tailing, fog, etc. on the recording paper.

EXAMPLE 7

A semi-solid ink was obtained in the same manner as in Example 15 except for changing the mixing ratio of the ink in Example 15 to 25 parts by weight of the rigid ester wax, 80 parts by weight of the isoparaffin and 5 parts by weight of Irgadine Red.

The viscosity of the semi-solid ink was found to be 130 cps under the conditions of a temperature of 25° C. and a shear rate of 2000 $S^{-1}$, and 12 cps under the conditions of a temperature of 120° C. and a shear rate of 2000 $S^{-1}$.

When the recording characteristics of this ink were evaluated in the same manner as in Example 15 by use of the same recording head in Example 15 except for changing the applied pressure on ink to 0.05 to 0.5 kg/cm$^2$, recorded dots could be recorded with high sensitivity in response to the potential pulses, to effect recording of high quality without tailing, fog, etc. on the recording paper.

EXAMPLE 18

A semi-solid ink was obtained in the same manner as in Example 15 except for using a polyethylene wax (Hiwax 400, produced by Mitsui Sekiyu Kagaku K.K., softening point 132° C.), and the recording characteristics of this ink were evaluated. The viscosity of the semi-solid ink was found to be 7500 cps under the conditions of a temperature of 25° C. and a shear rate of 2000 $S^{-1}$, and 460 cps under the conditions of a temperature of 120° C. and a shear rate of 2000 $S^{-1}$. The ink of this Example was substantially free from tailing, fog, etc., but response to the potential pulses was slightly slow.

COMPARATIVE EXAMPLE 9

A semi-solid ink was obtained in the same manner as in Example 15 except that the mixing ratio of the ink was changed to 10 parts by weight of the rigid ester wax, 95 parts by weight of the iso-paraffin and 5 parts by weight of Irgadine Red.

The viscosity of this ink was found to be 95 cps under the conditions of a temperature of 25° C. and a shear rate of 2000 $S^{-1}$.

When the recording characteristics of this ink were evaluated in the same manner as in Example 15 by use of the same recording head in Example 15 except for changing the applied pressure on ink to 0 to 0.2 kg/cm$^2$, response of the recorded dots to potential pulses was relatively good, but tailing, fog, etc. were observed on the recording paper.

COMPARATIVE EXAMPLE 10

A semi-solid ink was obtained in the same manner as in Example 15 except that the mixing ratio of the ink in Example 15 was changed to 75 parts by weight of the rigid ester wax, 30 parts by weight of the iso-paraffin and 5 parts by weight of Irgadine Red.

The viscosity of this ink was found to be 21000 cps under the conditions of a temperature of 25° C. and a shear rate of 2000 $S^{-1}$.

When the recording characteristics of this ink were evaluated in the same manner as in Example 15 by use of the same recording head in Example 15 except for changing the applied pressure on ink to 1 to 10 kg/cm$^2$, response of the recorded dots to potential pulses was slow, and tailing and fog, etc. were observed on the recording paper.

EXAMPLE 19

The recording head 1 as shown in FIG. 2 was constituted as described below, and transfer recording was performed by use of an ink 3 composed mainly of a petroleum resin as described below.

That is, by use of a carbon resistor as the heat-generater 4 of the recording head 1, said heat-generater 4 was arranged in an array with a pitch of 1 mm and each heat-generater 4 was perforated with four ink passing holes 4a each comprising a thru-hole with a hole diameter of 0.2 mm.

On the other hand, the window 7 was constituted of a glass material with a thickness of 0.05 mm and ink reservoirs 8 of 0.8 mm×0.8 mm were formed in an array.

Further, voltage pulses of 24 V×20 ms were applied and a static pressure of a gauge pressure of 0.1 atm. was applied within the housing 2.

Also, the ink 3 employed was prepared by formulating the following components:

1. aromatic petroleum resin: Nisseki Neopolymer S: 76 wt. % {produced by Nippon Gosei Jushi K.K., softening point: 95° C. (ring and ball method)}
2. Ethyl cellosolve: 26 wt. % (ethylene glycol monoethyl ether)
3. dye: Oil Blue IIN: 2 wt. % (produced by Orient Kagaku Kogyo K.K.)

The above aromatic petroleum resin was heated to melt to about 150° C., and the dye and ethyl cellosolve were added successively thereto in this order, followed by stirred well with the respective components to prepare an ink which was used.

The viscosity of the semi-solid ink was found to be 8600 cps under the conditions of a temperature of 25° C. and a shear rate of 2000 $S^{-1}$, and 400 cps under the conditions of a temperature of 120° C. and a shear rate of 2000 $S^{-1}$.

The above ink 3 was housed in the housing 2, and image was recorded on two kinds of recording medium, a plain paper and a tetrafluoroethylene sheet which becomes an electronic blackboard sheet, with the result that transferability was good. Also, the recorded image on the tetrafluoroethylene sheet could be well erased with a blackboard eraser for white board.

EXAMPLE 20

According to the same procedure as in Example 19, transfer recording was performed by use of an ink composed mainly of a petroleum resin containing the following components:

1. aliphatic petroleum resin: Highlets T-100X: 50 wt. % (produced by Mitsui Sekiyu Kagaku K.K., softening point: 100° C.)
2. solvent naphtha: 47 wt. %
3. dye: Oil Blue IIN: 3 wt. % (produced by Orient Kagaku Kogyo K.K.)

The viscosity of the semi-solid ink was found to be 9200 cps under the conditions of a temperature of 25° C. and a shear rate of 2000 $S^{-1}$, and 370 cps under the conditions of a temperature of 120° C. and a shear rate of 2000 $S^{-1}$.

When image was recorded on the same recording media as in Example 19 by use of the above ink, transferability was good, and also good erasability was exhibited for the recorded image on the tetrafluoroethylene sheet.

EXAMPLE 21

According to the same procedure as in Example 19, transfer recording was performed by use of an ink composed mainly of a petroleum resin containing the following components:

1. aliphatic petroleum resin: Alcon P-90: 58 wt. % (produced by Arakawa Kagaku Kogyo K.K., softening point: 90° C.)
2. n-octanol: 20 wt. % n-butyl acetate: 20 wt. %
3. dye: Oil Black HBB 2 wt. % (produced by Orient Kagaku Kogyo K.K.)

The viscosity of the semi-solid ink was found to be 7000 cps under the conditions of a temperature of 25° C. and a shear rate of 2000 $S^{-1}$, and 470 cps under the conditions of a temperature of 120° C. and a shear rate of 2000 $S^{-1}$.

When image was recorded on the same recording media as in Example 19 by use of the above ink, transferability was good, and also good erasability was exhibited for the recorded image on the tetrafluoroethylene sheet.

EXAMPLE 22

According to the same procedure as in Example 19, transfer recording was performed by use of an ink shown below containing no petroleum resin as the component:

1. EVA: 50 wt. %
2. methyl isobutyl ketone: 20 wt. % methyl ethyl ketone: 25 wt. %
3. dye Nigrosine BASE EX 5 wt. %

The viscosity of the semi-solid ink was found to be 7600 cps under the conditions of a temperature of 25° C. and a shear rate of 2000 $S^{-1}$, and 1150 cps under the conditions of a temperature of 120° C. and a shear rate of 2000 $S^{-1}$.

When image was recorded on the same recording media as in Example 19 by use of the above ink, transferability was good, but the recorded image on the tetrafluoroethylene sheet could not be erased with the blackboard eraser for whiteboard.

EXAMPLE 23

According to the same procedure as in Example 19, transfer recording was performed by use of an ink shown below containing no petroleum resin as the component:

1. polyamide resin: 60 wt. %
2. iso-paraffin: Nisseki Isozol 300: 46 wt. % (produced by Nippon Sekiyu Kagaku K.K.)
3. dye Ceres Orange R: 4 wt. %

The viscosity of the semi-solid ink was found to be 15000 cps under the conditions of a temperature of 25° C. and a shear rate of 2000 $S^{-1}$, and 770 cps under the conditions of a temperature of 120° C. and a shear rate of 2000 $S^{-1}$.

The above ink was prepared according to the method in which the respective components were weighted and mixed, added together with glass beads of 1.5 mm diameter into a single cylinder type sand mill maintained at 140° C., dispersed and mixed at 2000 rpm for 30 minutes, and the beads were separated before cooling, to prepare a semi-solid ink.

When image was recorded on the same recording media as in Example 19 by use of the above ink, transferability was good on the plain paper, but not so good on the tetrafluoroethylene sheet, and the erasability of the recorded image on said sheet was not so good, although erasable.

EXAMPLE 24

By use of the recording head as shown in FIG. 2 and FIG. 3, image was recorded according to the same method and under the same conditions as in Example 19.

The semi-solid ink 3 was prepared as described below by use of the coumarone resin shown below:

(1) coumarone resin: (Nittetsu Coumarone G-90, produced by Shinnittetsu Kagaku K.K., softening point 93° C.) 68 wt. %
(2) xylene: 29.5 wt. %
(3) dye (Oil Blue II N, produced by Orient Kagaku Kogyo K.K.) 2.5 wt. %

That is, the coumarone resin according to the above recipe was heated to melt to 150° C., and the dye and xylene were added in the order thereto, followed by thorough stirred and mixed with the respective components, to prepare a semi-solid ink.

The viscosity of the semi-solid ink was found to be 8000 cps under the conditions of a temperature of 25° C. and a shear rate of 2000 $S^{-1}$, and 370 cps under the conditions of a temperature of 120° C. and a shear rate of 2000 $S^{-1}$.

Using the semi-solid ink, image was formed on two kinds of recording medium, a plain paper and a tetrafluoroethylene sheet (Aflex, produced by Asahi Glass K.K.), by use of the above recording head on each of said two kinds of recording media and recording characteristics were evaluated. Also, the images formed on the tetrafluoroethylene sheet were evaluated for its erasability with a blackboard eraser for white board. The results are shown in Table 1.

From Table 1, it is clear that the semi-solid ink of the present invention is excellent in both recordability and erasability.

EXAMPLE 25

Except for using the semi-solid ink of the following recipe, the recording characteristics and erasability of this ink were evaluated in the same manner as in Example 24. The results are shown in Table 1.

(1) coumarone resin: (Nittetsu Coumarone T-120, produced by Shinnittetsu Kagaku K.K., softening point 119° C.) 55 wt. %
(2) benzyl alcohol: 20 wt. % ethyl accetate: 22 wt. %
(3) dye (Oil Black HBB, produced by Orient Kagaku Kogyo K.K.) 3 wt. %

The viscosity of the semi-solid ink was found to be 9600 cps under the conditions of a temperature of 25° C. and a shear rate of 2000 $S^{-1}$, and 450 cps under the conditions of a temperature of 120° C. and a shear rate of 2000 $S^{-1}$.

EXAMPLE 26

Except for using the semi-solid ink of the following recipe, the recording characteristics and erasability of this ink were evaluated in the same manner as in Example 24. The results are shown in Table 1.

(1) coumarone resin: (Nittetsu Coumarone G-75, produced by Shinnittetsu Kagaku K.K., softening point 78° C.) 75 wt. %
(2) dimethyl ether: 22 wt. %
(3) dye (Oil Blue IIN, produced by Orient Kagaku Kogyo K.K.): 3 wt. %

The viscosity of the semi-solid ink was found to be 5500 cps under the conditions of a temperature of 25° C. and a shear rate of 2000 $S^{-1}$, and 300 cps under the conditions of a temperature of 120° C. and a shear rate of 2000 $S^{-1}$.

COMPARATIVE EXAMPLE 11

By use of the copolymer, the paraffin and the dye shown in the following recipe, designed amounts of these were weighed and mixed, then added together with 1.5 mm diameter glass beads into a single cylinder type sand mill maintained at 140° C., dispersed and mixed at 2000 rpm for 30 minutes, and beads were separated before cooling to prepare a semi-solid ink.

(1) ethylene-vinyl acetate copolymer resin: 30 wt. %
(2) iso-paraffin (Nisseki Isozol 300, produced by Nippon Sekiyu Kagaku K.K.): 46 wt. %
(3) dye (CERES Orange R, produced by Bayer AG, West Germany): 4 wt. %

The viscosity of the semi-solid ink was found to be 22000 cps under the conditions of a temperature of 25° C. and a shear rate of 2000 $S^{-1}$, and 600 cps under the conditions of a temperature of 120° C. and a shear rate of 2000 $S^{-1}$.

Except for using the semi-solid ink, recording characteristics and erasability of the ink were evaluated in the same manner as in Example 24. The results are shown in Table 1.

TABLE 1

| | Image quality | | Erasability |
|---|---|---|---|
| | Plain paper | Sheet | for sheet |
| Example 24 | 0 | 0 | 0 |
| Example 25 | 0 | 0 | 0 |
| Example 26 | 0 | 0 | 0 |
| Comparative Example 11 | 0 | Δ | Δ |

[Evaluation standards]
Image quality: 0: good, Δ: slightly inferior
Erasability: 0: completely erased by rubbing
Δ: slightly bad, but erasable It is apparent from the above Table 1, that the semi-solid ink of the present invention exhibits not only good recordability also onto a recording medium which is inpenetrable and has the surface with relatively poor wettability, but also is excellent in erasability.

What is claimed is:

1. A semi-solid heat transfer recording ink for recording, wherein said semi-solid ink is heated so as to melt and flow through passage holes and transfer onto a recording medium, said semi-solid ink having a viscosity of 100 to 1000 cps as measured by means of a cone disc rotatory viscometer under the conditions of a temperature of 25° C. and a shear rate of 2000 $S^{-1}$ and a thermal conductivity of from $1.5\times10^{-4}$ to $9.7\times10^{-2}$ cal(cm·sec·deg)$^{-1}$ at a temperature of 25° C., and containing from 10–70 wt % of a wax and from 30–90 wt % of at least one selected from the group consisting of a naphthenic hydrocarbon, a modified silicone oil, and a paraffinic hydrocarbon.

2. A semi-solid ink according to claim 1, wherein said semi-solid ink has a viscosity of 200 to 5000 cps.

3. A semi-solid ink according to claim 1, wherein said semi-solid ink has a viscosity of 100 to 10000 cps as measured by means of a cone disc rotatory viscometer under the conditions of a temperature of 25° C. and a shear rate of 2000 $S^{-1}$, and a viscosity of 1 to 500 cps as measured by means of said cone disc rotatory viscometer under the conditions of a temperature of 120° C. and a shear rate of 2000 $S^{-1}$.

4. A semi-solid ink according to claim 1, wherein said wax has a melting point of 130° C. or lower.

5. A semi-solid ink according to claim 4, wherein said wax has a melting point of 40° to 120° C.

6. A semi-solid ink according to claim 1, wherein said wax has a melt viscosity of 4 to 200 cps at 130° C.

7. A semi-solid ink according to claim 1, wherein said naphthenic hydrocarbon is liquid at ordinary temperature.

8. A semi-solid ink according to claim 1, wherein said naphthenic hydrocarbon has a viscosity of 2000 cps or lower at 40° C.

9. A semi-solid ink according to claim 8, wherein said naphthenic hydrocarbon has a viscosity of 500 cps or lower at 40° C.

10. A semi-solid ink according to claim 1, wherein said modified silicone oil has a viscosity of 2500 cps or lower at 25° C.

11. A semi-solid ink according to claim 10, wherein said modified silicione oil has a viscosity of 500 cps or lower at 25° C.

12. A semi-solid ink according to claim 1, wherein said paraffinic hydrocarbon has a boiling point of 150° C. or higher.

13. A semi-solid heat transfer ink for recording, wherein said semi-solid ink is heated so as to melt and flow through passage holes and transfer onto a recording medium, said semi-solid ink having a viscosity of 100 to 10000 cps as measured by means of a cone disc rotatory viscometer under the conditions of a temperature of 25° C. and a shear rate of 2000 $S^{-1}$, and thermal conductivity of from $1.5\times10^{-4}$ to $9.7\times10^{-2}$ cal(cm·sec·deg)$^{-1}$ at a temperature of 25° C., and containing from 50 to 90 wt. % petroleum resin as a binder.

14. A semi-solid ink according to claim 13, wherein said petroleum resin is a resin containing coumarone or indene or a copolymer thereof.

15. A semi-solid ink according to claim 14, wherein a resin containing coumarone or indene or a copolymer thereof is represented by the following structural formula:

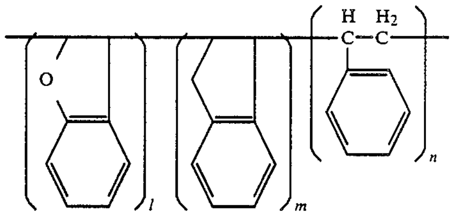

wherein l is an integer of 0 to 20, m is an integer of 0 to 25, n is an integer of 0 to 28, with proviso that l and m cannot be 0 at the same time.

16. A semi-solid ink according to claim 15, wherein said resin has an average molecular weight of 300 to 2500.

* * * * *